C. KINSLEY.
METHOD OF TELEGRAPHIC TRANSMISSION.
APPLICATION FILED JUNE 24, 1914.
1,150,272.
Patented Aug. 17, 1915.
4 SHEETS—SHEET 4.
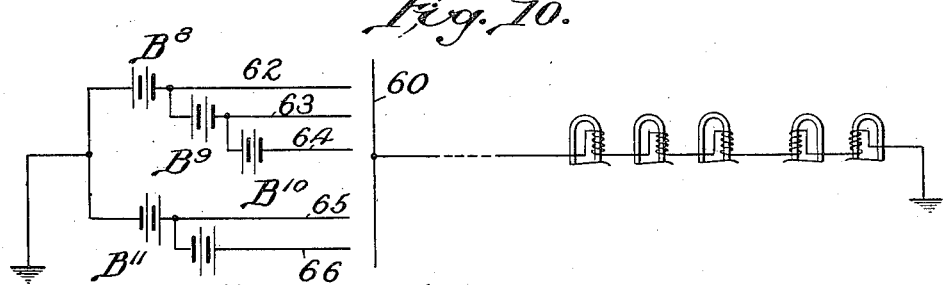
*Fig. 10.*
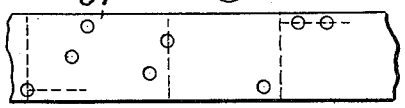
*Fig. 11.*
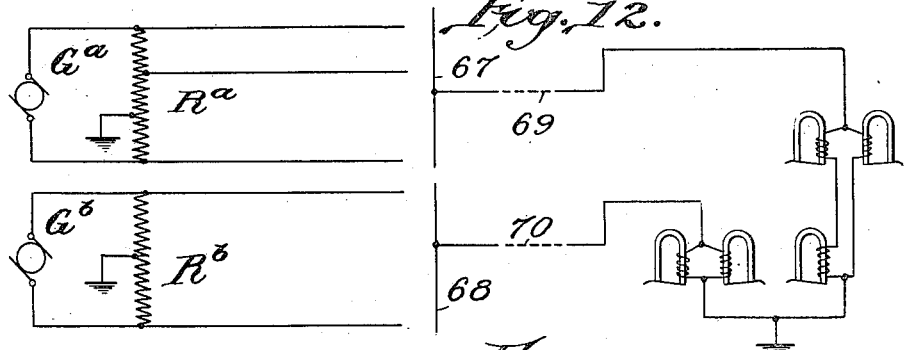
*Fig. 12.*
ABCDEFGHIJKLMNOPQRSTUVWXYZ
*Fig. 13.*
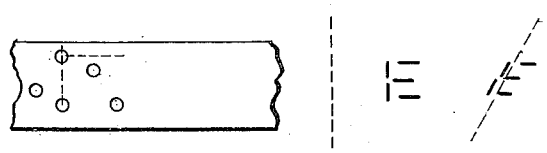
*Fig. 14.*
Witnesses
C. S. Grumman
James H. Marr
Inventor
Carl Kinsley
By Edward E. Clement
Attorney

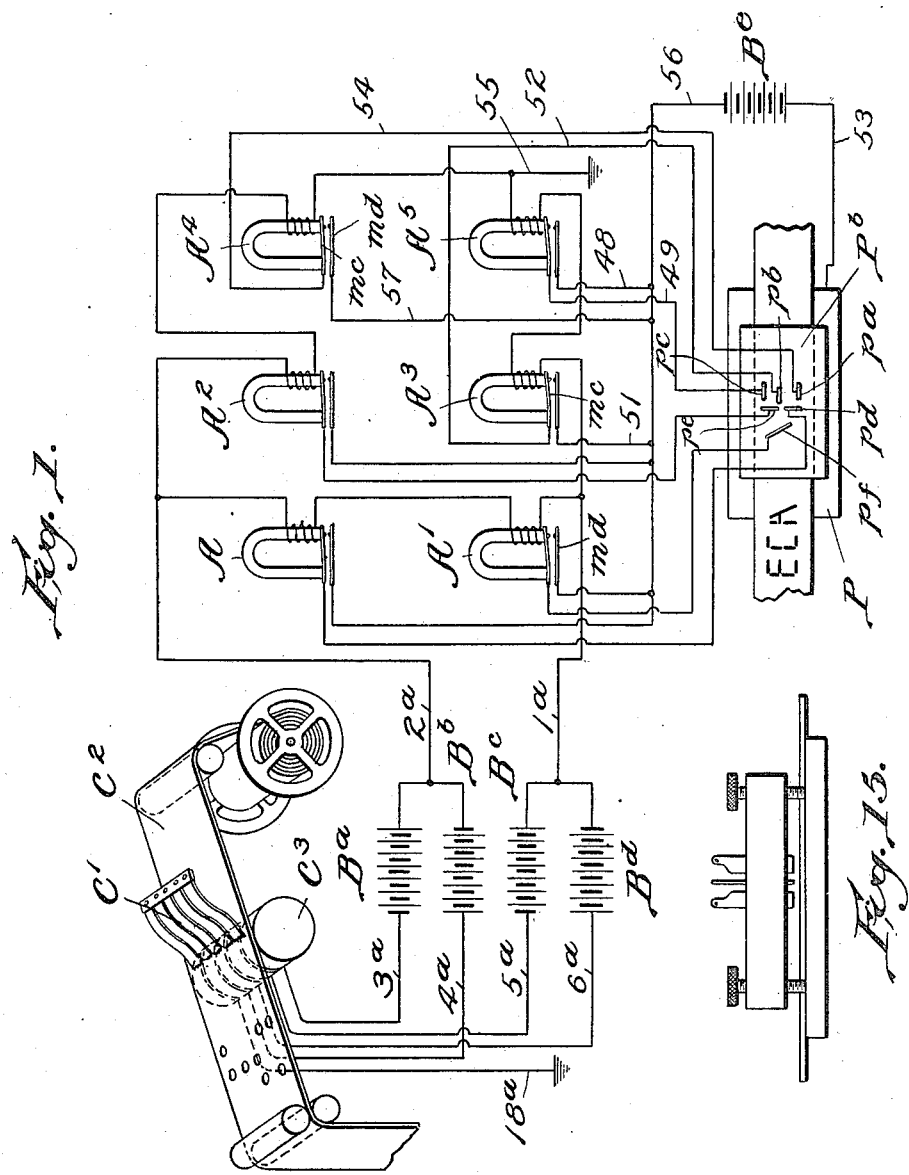

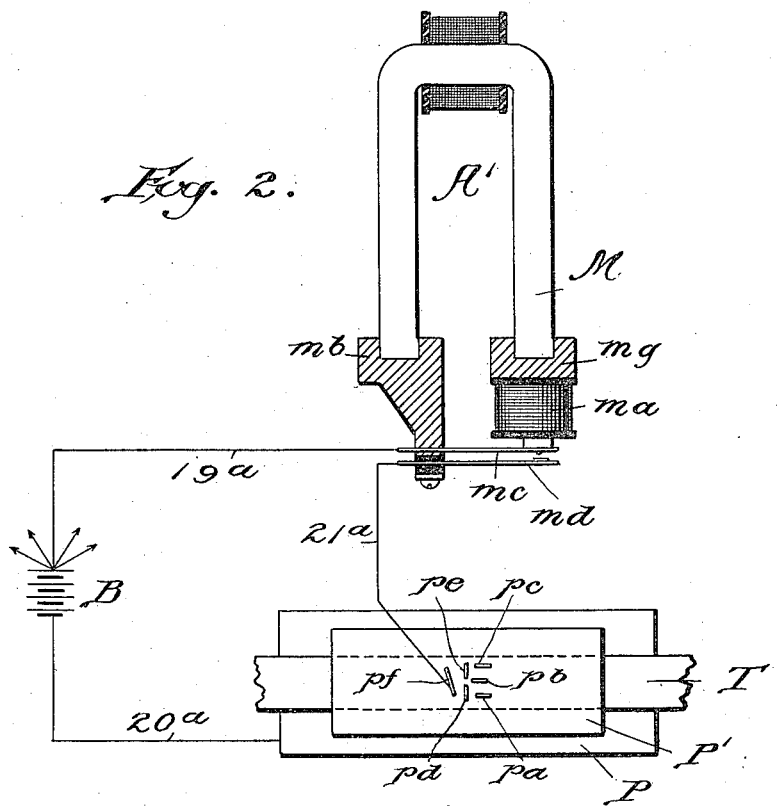
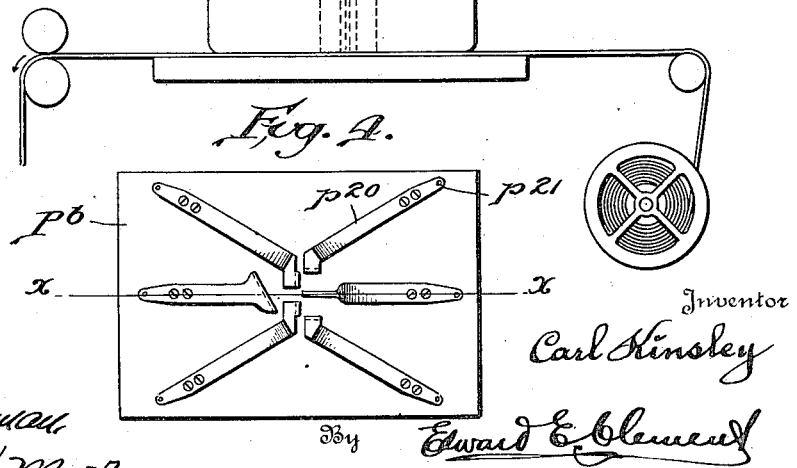

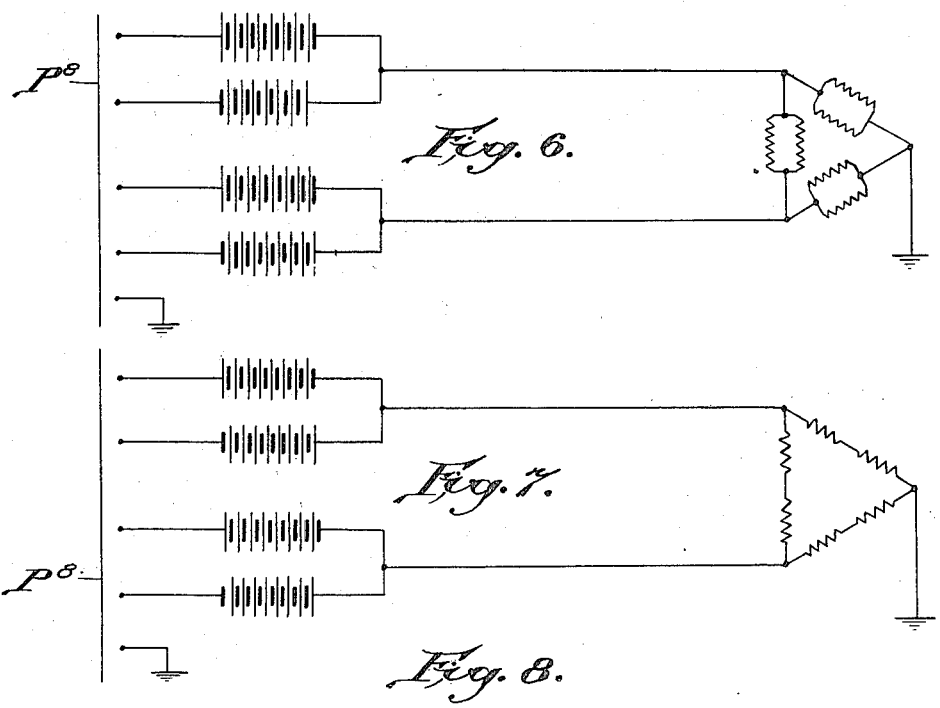

UNITED STATES PATENT OFFICE.

CARL KINSLEY, OF CHICAGO, ILLINOIS.

METHOD OF TELEGRAPHIC TRANSMISSION.

1,150,272.    Specification of Letters Patent.    Patented Aug. 17, 1915.

Original application filed November 26, 1907, Serial No. 403,885. Divided and this application filed June 24, 1914. Serial No. 847,051.

*To all whom it may concern:*

Be it known that I, CARL KINSLEY, a citizen of the United States, residing at Chicago, county of Cook, State of Illinois, have invented certain new and useful Improvements in Methods of Telegraphic Transmission, of which the following is a specification, reference being had therein to the accompanying drawing.

My invention relates to the art of telegraphy, and has for its object the improvement of methods of receiving and recording telegraphic signals transmitted at high speed.

In a prior application, Serial No. 169,228, filed August 12, 1903, I described a method of operation depending upon the action of printing magnets whose armatures were equipped with character faced type electrodes. The line impulses in that case were caused to directly affect the printing agencies, and the possible speed of receiving was rendered very high, by establishing a certain relation between the periodicity of the printing elements and the frequency and duration of the line impulses. In order to render the time constant of each printing agency or magnet small enough to be negligible, the actual printing elements were normally held inactive or disabled, under stress, in such manner as to store up energy, the holding force being electromagnetic, and the release for printing being due to a partial or complete neutralization of the magnetism thereof, due to the line impulses received.

In another prior application, Serial No. 403,885, filed November 26, 1907, I have described a system in which instead of the line impulses directly effecting the printing elements, I provide relays with attenuated armatures normally held under stress by electromagnetic force, so that in obedience to the line impulses the armatures may be released in the same manner as in the preceding application referred to; and having thus deprived the electromagnetic responsive elements of any direct printing feature, I provide character faced printing electrodes fixed with respect to a record surface and platen, together with local circuits for the same, one of which is controlled by each of the line relays, or responsive agencies. By fixing the printing electrodes in this manner, and printing by means of the passage of electric current or an electric spark, I reduce to zero the time constants of the electrodes themselves, and by detaching the printing members from the relay armatures, leaving them plain, simple, attenuated spring contacts, I reduce their time constant, and increase the certainty as well as speed of their operation very materially.

In the aforesaid application Serial No. 403,885, I have claimed only the apparatus, and not the method of transmitting and receiving which is therein described. The present application is a division of the said prior application 403,885, and in it I shall describe the same system, but shall claim only the method of operation which may conveniently be practised with the apparatus embodied in that system.

It will be clearly understood, that this method may be practised with other systems of circuits and that the system herein described and illustrated is presented merely for the purpose of specific definition, and not by any means for purposes of limitation.

I believe I am the first to produce a method of operation by which the relays instead of being direct acting are indirect, that is to say the energy for their operation is supplied locally and stored up until needed, being released in obedience to a slight current change in the line, and thereupon acting independently of the continuance of the line current to control the action of printing agencies whose response is practically instantaneous.

I shall therefore claim this method both broadly and specifically herein, and wish it to be understood that I contemplate all such non-essential changes as do not depart from the scope and purview of my invention, but fall fairly within the terms of the appended claim.

Referring to the accompanying drawings, wherein the same reference letters indicate the same parts throughout, Figure 1 is a diagram of a complete system embodying my invention. Fig. 2 illustrates diagrammatically one of the local circuits with a printing platen and printing member and with the polar relay enlarged. Fig. 3 is a side elevation of the printing platen, its associated printing members and the printing tape, as shown in plan in Fig. 2. Fig. 4 is a plan view of the preferred form and mounting for the printing electrodes. Fig. 5 is a longitudinal section taken on line $x-x$ of Fig. 4. Fig. 6 is a theoretical diagram showing the relays arranged in parallel. Fig. 7 is a similar diagram showing the relays in series or as used in Fig. 1, and showing in a simplified way the triangular connection of the coils. Fig. 8 shows an alphabet used with the circuits and apparatus of Figs. 1 to 7. Fig. 9 is an alphabet composed of five elements. Fig. 10 is a diagrammatic view of a complete system used to form the alphabet shown in Fig. 9. Fig. 11 is a fragmentary piece of the transmitting tape and detached therefrom is an illustration of the arrangement of the printing elements. Fig. 12 is a diagrammatic view of a system using generators instead of batteries. Fig. 13 is an illustration of a five-element alphabet produced by the receiver of Fig. 12. Fig. 14 is a fragmentary view of the printing tape showing detached therefrom the arrangement of the printing elements for said alphabet, and also one arrangement of the printing elements to make a sloping letter. Fig. 15 is a view similar to Fig. 3 showing a modified arrangement of the platen for printing by spark.

Referring to Fig. 1, line wires $1^a$ and $2^a$ are employed, leading from the transmitting station to the receiving station. In operation, I automatically record the messages in legible characters at the receiving station through the agency of a number of polarized printing relays, worked by positive and negative impulses sent over the line wires $1^a$ and $2^a$ separately or simultaneously. The mechanical arrangement for controlling the transmission of impulses is merely indicated in Fig. 1. A paper tape $C^2$ passes over a platen $C^3$ and under a set of springs or contact brushes $C'$ (shown in Fig. 1). The brushes $C'$ are permitted to make contact at predetermined times and in predetermined order with the platen $C^3$ through perforations punched in the tape in any suitable manner. As the method of preparing tape in this way is well understood in the art it is unnecessary for me to describe it. All messages are punched in the tape as a preliminary to the transmitting operation.

The circuit connections of the transmitter are as follows: $B^a$, $B^b$, $B^c$, $B^d$ are the main transmitting batteries, arranged in pairs with poles reversed to line, and connected to the line conductors $1^a$ and $2^a$ as shown. The wires $3^a$, $4^a$, $5^a$, $6^a$, connect the other poles of the batteries to four of the five collector rings over which the tape $C^2$ passes. The fifth collector ring is connected to the ground by the wire $18^a$.

The relays at the receiving station control local circuits which include the printing electrodes $p^a$, $p^b$, $p^c$, $p^d$, $p^e$, $p^f$, and the printing platen P. The mechanical features of these relays and the circuits and parts controlled thereby will be pointed out presently.

Their connections are shown in Fig. 1. The windings of relays A and A' are included in series in a bridge across the line wires $1^a$ and $2^a$, this bridge constituting one side of a triangle at the receiving station. The windings of the relays $A^3$ and $A^5$ are connected in series in a ground branch from wire $1^a$, forming another side of the triangle; while the windings of relays $A^2$ and $A^4$ are similarly connected in series in a ground branch from the line wire $2^a$ forming the third side of the triangle. The ground connection is marked 55. It will thus be seen that each side of the triangle contains one pair of series, the relays of each pair being oppositely polarized from each other.

Each relay is provided with a movable contact $m^c$ and a coöperating or anvil contact $m^d$. Each of the relays has its contacts $m^c$ and $m^d$ connected in a local circuit and normally held open by its magnet. All the local circuits have a common return which includes a source of current $B^e$, and a common printing platen P, over which the individual printing contacts rest upon the tape T. This tape is chemically sensitized with any one of the several solutions commonly employed for that purpose, such as potassium ferro-cyanide, which may be mixed with ammonium nitrate to preserve the moisture of the tape. I preferably make the tape rather dry and boost the potential of the current in the local circuits. When the above mentioned solution is used the actual printing tips should be of iron. However, I may use aluminum, platinum, or other suitable material, and change my sensitizing solution accordingly. The local circuit of the electrode $p^b$, which is closed by the relay $A^3$, is as follows: from the battery $B^e$, through wire 56, wire 51, anvil contact $m^d$, movable contact $m^c$, wire 52, electrode $p^b$, through the printing tape to the printing platen P and back to battery by wire 53. The local circuit of the electrode $p^a$, which is controlled by the relay $A^4$, is as follows: battery $B^e$, wire 56, wire 57, anvil contact $m^d$, movable contact $m^c$, wire 54, electrode $p^a$, through the printing tape T to the printing platen P, and back to battery by wire 53. The electrode $p^c$ has its circuit traced as follows: $B^e$, 56, 48, contacts of relay $A^5$, wire 49, $p^c$, through the printing tape T, printing platen P, and back to the battery by wire 53. The circuits of electrodes $p^d$, $p^e$, $p^f$ are similar to those given and need not be traced.

In Fig. 2, I have shown a simplified diagram of a local circuit with one form or type of relay. This relay comprises an electro or permanent magnet M having pole pieces $m^b$ and $m^g$, the latter reduced in diameter for a portion of its length to form a core for the coil $m$. The contact spring $m^c$ and the anvil strip $m^d$ are fixed upon the pole piece $m^b$, with their free ends extending into operative contiguity with the pole $m^g$, and the spring $m^d$ insulated from the pole $m^b$ and spring $m^c$. Normally the end of the spring $m^c$ is held up to the pole so as to maintain the spring in a distorted shape, and under tension. This spring is of such proportion as to have a high natural period, but is attenuated as to mass, so as to respond to line impulses of various frequencies. A conductor $19^a$ is connected from the spring $m^c$ to the battery. From the opposite side of the battery the common return conductor $20^a$ leads to the printing platen P. The circuit is completed to the electrode $p^t$ by wire $21^a$ connected to the anvil contact $m^d$. All of the contacts are mounted in a stationary insulating block $P^b$ held in any suitable manner upon or over the printing tape T so that all of the printing electrodes $p^a$, $p^b$, etc. are fixed.

In Fig. 3 I show the block resting directly on the tape, but when printing by spark it is of course raised by means of posts or screws, preferably supported on the platen P, as shown in Fig. 15. The coil $m^a$ is connected to line and when a current of suitable direction passes through it the magnet M is weakened or neutralized to release the contact spring $m^c$ which then snaps down into engagement with the anvil contact $m^d$, and the circuit including the conductor $19^a$, battery $B^e$, conductor $20^a$, printing platen $P^a$, and electrode $p^t$ is thus closed through the tape. The potential difference due to battery $B^e$ is sufficient to cause current to pass through the tape to the platen $p^a$, and thus effect a chemical decomposition in the tape to print. The impulses which affect the magnet M are of course only momentary and while they are sufficient to weaken the magnetism in the relay magnet and allow the movable contact $m^c$ to snap into engagement with the anvil contact $m^d$, they are not sufficiently long to prevent the immediate reattraction of the movable contact. The six electrodes and six relays are sufficient to print the entire alphabet, so that by sending properly coördinated impulses of selected polarity any letter or numeral may be produced on the tape. For instance, if relay $A^3$ is energized followed immediately by relays $A^5$ and $A^4$ and then by relays $A^2$ and A, the letter "E" would be produced; or if relay $A^3$ is energized followed shortly by relays $A^2$ and A and then after the proper interval by relay $A'$, the letter "A" would be produced.

In Figs. 4 and 5 I have illustrated a preferred method of mounting the several electrodes. As represented here, the contacts are formed as integral parts of springs secured to the top of the mounting block $P^b$, and have their printing tips or surfaces extending below the bottom of the mounting block so that when the structure is pressed into engagement with the tape the electrodes are moved upward against the tension of the springs. In this way, any wearing away of the metal of the electrodes due either to friction or corrosion or variations in thickness of the paper, will be compensated for and a permanent and positive contact between them and the paper will be assured at all times. I have numbered these springs $p^{20}$ so as to properly distinguish them and have shown each one provided with a contact tip $p^{21}$ for solder connection with its respective local circuit wire.

In Figs. 6 and 7 I have illustrated the theoretical arrangement of the circuits, the latter figure being a schematic diagram of the series arrangement shown in Fig. 1, and the former being a similar arrangement, with the windings of the relays arranged in parallel. The wire $P^8$ in both figures has brush terminals for effecting circuit connections to transmit the proper impulses.

In Fig. 8 I show an alphabet composed of six elements which is especially adapted for use with the arrangements of circuits and apparatus shown in Figs. 1 to 7.

In Figs. 1 to 8 inclusive, I have illustrated a six-element system, but I desire it to be understood that I also use five or less elements and still produce a perfectly legible alphabet, as illustrated in Fig. 9. This figure shows the product of the receiver of Fig. 10 in which I have shown a one-wire system having three current strengths, with the receiving relays arranged in series in the line and with the operating pens or contacts of three of the relays reversed with respect to the other two. I have indicated the platen as a single line numbered 60. Brushes are secured to the battery leads 62, 63, 64, 65, and 66 and are adapted to rest upon the paper so as to drop or be forced through the openings in the tape as they register with the particular brushes. It will be seen that if the brush connected to lead 62 is thus touched to the platen 60 through an aperture in the tape an impulse from battery $B^8$ will pass over the line and the relay set to respond to current from $B^8$ will have its permanent pole neutralized so as to release its pen and allow it to snap down into contact with the anvil $m^d$, thereby closing the local circuit to the associated electrode resting on the chemically sensitized printing tape (not shown herein). If the brush connected to lead 63 be touched to the platen through an aperture in the tape, batteries $B^8$ and $B^9$ will be connected in series and thus current of a different strength will be transmitted. Similar results follow if the other brushes be touched to the platen, but the batteries $B^{11}$ and $B^{12}$ have their poles reversed to line, to work the reversed relays.

In Fig. 12, a system is shown employing five relays at the receiving station, permitting the use of five instead of six elements for printing. In this figure I have shown two platens 67 and 68 connected to the line wires 69 and 70 which lead to the different relays. The generators $G^a$ and $G^b$ have their terminals bridged by the resistances $R^a$ and $R^b$ the former being divided into three parts and the latter into two parts. In this manner I am enabled to determine to a nicety the current strength supplied to the relays and the direction thereof. The relays connected to line 70 are two in number and are arranged in multiple, and the relays connected with line 69 are three in number arranged in series multiple. The alphabet shown in Fig. 13 is made up of five straight-line elements formed by the successive action of the relay contacts or armatures as they are snapped into engagement with their fixed anvils so as to pass current to the chemically sensitized recording tape at the receiving end of the line.

Many changes may be made in the circuits and apparatus thus described, and in fact my present invention may be practised with other forms of apparatus and circuits than those hereinbefore described. It is to be clearly understood that I have already stated that I contemplate all such changes in the use of different apparatus and circuits, and all methods of operation which fall fairly within the scope of the appended claim.

I believe that the method of printing with six, five, or less straight-line printing elements, to produce all the letters of the alphabet and all of the numerals in the manner herein described, is novel, and I shall claim the same.

Having thus described my invention what I claim and desire to secure by Letters Patent is:

The method of printing electrical signals transmitted at high speed which consists in the following steps: (1) applying a potential driving force to each one of a group of circuit controlling agencies, and maintaining the same normally inoperative by a balancing holding force continuously sustained in opposition to said driving force; (2) transmitting in predetermined order a succession of single impulses of individually differing character, at a frequency of such an order that the individual time constant of each circuit controlling agency will be substantially the same as or greater than the effective time element of each individual line impulse; (3) causing each of said impulses according to its character to selectively affect one of said circuit controlling agencies so as to instantaneously unbalance the same by neutralizing or weakening the holding force during the effective part of the impulse only; (4) releasing the potential driving force applied to the selected circuit controlling agency and causing the same thereby to become actuated through one complete cycle of operation; (5) causing an instantaneous change in impressed E. M. F. and corresponding rise of current in a local circuit; and (6) exposing to said instantaneous E. M. F. and the current rise and fall produced thereby, a local printing agency having an electrical and mechanical time constant of a value not exceeding the time interval between the effective part of one operating impulse and the corresponding part of the next succeeding impulse.

In testimony whereof I affix my signature in presence of two witnesses.

CARL KINSLEY.

Witnesses:
 M. V. MEHREN,
 PETER MATHIAS.